United States Patent [19]

Weiland

[11] 4,072,283

[45] Feb. 7, 1978

[54] AERIAL REFUELING BOOM ARTICULATION

[75] Inventor: Richard Herschel Weiland, Seattle, Wash.

[73] Assignee: The Boeing Company, Seattle, Wash.

[21] Appl. No.: 751,553

[22] Filed: Dec. 17, 1976

[51] Int. Cl.$^2$ ............................................. B64D 39/00
[52] U.S. Cl. ................................. 244/135 A; 141/387
[58] Field of Search ................. 244/135 R, 135 A, 88; 214/1 CM; 141/284, 387, 388

[56] References Cited

U.S. PATENT DOCUMENTS

| | | | |
|---|---|---|---|
| 2,386,915 | 10/1945 | Spittler | 244/88 |
| 2,670,913 | 3/1954 | Castor et al. | 244/135 A |
| 2,859,002 | 11/1958 | Leisy | 244/135 A |
| 2,960,295 | 11/1960 | Schulze | 244/135 A |

*Primary Examiner*—Trygve M. Blix
*Assistant Examiner*—Galen L. Barefoot
*Attorney, Agent, or Firm*—H. Gus Hartmann; Bernard A. Donahue

[57] ABSTRACT

A flying refueling boom for an aerial tanker airplane, with a mechanism for moving the boom about different axes. The boom having a pair of aerodynamic surfaces formed into a Vee and known as ruddevators, for moving the boom about the following axes: a tiltable vertical axis for boom movement in a sideways direction or in azimuth; a lateral axis for boom movement in an up-and-down direction or in elevation; and a longitudinal axis for movement of the boom about a roll axis. The ruddevator control system includes a pantographing cable system for automatically changing the angle-of-attack of the aerodynamic surfaces and for alleviating air loads imposed by the receiver airplane, when it is imparting the movement of the boom during refueling engagement. The boom support system includes an articulation mechanism for combining a certain amount of boom roll motion as a function of azimuth movement of the boom; and a device for varying the ratio between the degree of roll motion change vs. the degree of azimuth change. The boom articulation mechanism accomplishes this without revising the existing pantographing system in the KC-135 tanker airplane, or its structure and functions to optimize the existing configuration to obtain the desired operating refueling envelope. Further embodiments depict boom articulation mechanisms for combining a predetermined amount of boom roll motion with sideward movement of the boom, while the tanker airplane is airborne, and thereby adapt the boom operating envelope to the different flight conditions of various types of receiver airplanes.

13 Claims, 7 Drawing Figures

AERIAL REFUELING BOOM ARTICULATION

BACKGROUND OF THE INVENTION

In an aerial tanker airplane used by the military known as the Boeing KC-135, a flying refueling boom is supported from the airplane about a fixed vertical axis for free pivotal movement in a sideward direction or in azimuth; and the boom is also supported for free pivotal movement about a lateral axis for up-and-down movement or in elevation. The means for moving the boom about these axes, is a pair of aerodynamic surfaces formed in a Vee and known as ruddevators. When the ruddevators are moved collectively to decrease their angle-of-attack, the boom will be moved downwardly; and a differential change in the angle-of-attack of the ruddevators will move the boom sidewardly.

Included in the ruddevator control system is a pantographing cable system, similar to that of a drafting machine, which functions to automatically position the ruddevators when the boom is moved by other than the boom operator's control stick; e.g., when engaged with a receiver airplane and the receiver airplane moves the boom in elevation, the ruddevators will automatically pantograph collectively until they are approximately parallel to the airstream; thereby, alleviating the air loads on the boom without any control input from the boom operator. Also, when the receiver airplane pulls the boom off to one side, the ruddevators will pantograph differentially to alleviate the air loads.

The present aerial tankers like the Boeing KC-135, as well as the previous tankers like the Boeing KB-29 and KC-97, have used a flying boom type of aerial refueling with considerable success. However, limitations in the aerodynamic performance of the boom become apparent when it is used at the ever increasing speeds and altitudes required to refuel the modern high speed military aircraft. In order to provide a flying boom system of aerial refueling that would permit a hook-up between the tanker airplane and the receiver airplane, at the normal cruise speed and altitude of the receiver airplane, there must be adequate aerodynamic control forces available from the airfoil surfaces activating the boom, in order to position it throughout a space envelope large enough for the receiver airplane to remain within, and with a reasonable effort on the part of the pilot of the receiver airplane and the boom operator. For the present known tanker airplanes like the Boeing KC-135, the increase in airspeed or Mach number of the tanker airplane to that required for optimum refueling of the present day military interceptor type airplane, could reduce the boom maneuvering envelope to the point where the refueling operation would be nearly impossible; e.g., if due to restrictions on the operation of the boom, the refueling operation requires that it be done at lower airspeeds, a considerable loss in altitude as well as true airspeed would be necessary for the receiver airplane. This could result in the increased vulnerability of both aircraft to enemy interception as well as the more severe weather conditions at the lower altitudes which could complicate the rendezvous and refueling hook-up operation.

One of the inherent aspects of the present known KC-135 ruddevator control system, is that when the boom is moved all the way over to one side of the azimuth envelope, there is quite a bit of air drag generated by the boom; and this results in a decrease in the aerodynamic control force effectiveness of the ruddevators in maintaining that extreme azimuth position. Also, at this extremity of the azimuth envelope, the wake flow from the boom blanks out the air flow over one of the ruddevators. It could be said, that with the KC-135 fixed vertical and horizontal hinge geometry, the boom yaws right out of control power, i.e., it can not be flown nor driven by the ruddevators to the extremities of the desired envelope.

A more detailed explanation of the manner in which this control system operates is disclosed in U.S. Pat. No. 2,960,295 to Schulze.

SUMMARY OF THE INVENTION

The invention relates to an improvement in the mechanism for attaching an aerial refueling boom to an aircraft such as the Boeing "Stratotanker" KC-135 airplane, to provide for elevation and azimuth motion of the boom during aerial refueling operation. This airplane is a jet propelled, long range, high altitude, high speed tanker-transport type airplane, and its primary mission is the refueling of other aircraft inflight. It is equipped with an aerial refueling system comprising a boom and nozzle, for transferring fuel to a receiver airplane.

The aerial refueling boom is basically a telescoping tube which is attached to the underside of the airplane fuselage by means of a yoke and trunnion mounting arrangement; and provides the means for transferring fuel from the tanker airplane to the receiver airplane while both aircraft are in-flight. Also, on the underside of the tanker airplane is a compartment for the boom operator who maneuvers the boom into contact with a properly equipped receiver type airplane.

One of the disadvantages of the present known refueling boom geometry, utilizing a fixed vertical azimuth axis and a fixed lateral elevation axis, is that as the boom is deflected sideways in yaw, the ruddevators become less effective and this limits the controlled travel of the boom and its refueling envelope.

One of the advantages of the present invention, which utilizes a fixed longitudinal axis with a tiltable or variable azimuth axis, is that this combination of articulation produces a predetermined roll angle as a function of the change in azimuth angle; and the advantage of introducing a roll angle, results in an increase in the effectiveness of the ruddevators and thereby provides a larger boom controlled refueling envelope.

Another advantage is that the roll angle vs. the azimuth angle can be changed through the use of different length arms and idler links in the mechanism geometry.

Another advantage is that the roll angle vs. the azimuth angle can be varied in flight through the function of an adjustable length arm mechanism in the articulation geometry.

Another advantage is that the variable azimuth axis of the present invention, can be incorporated into the present known boom control system such as the KC-135 which utilizes a ruddevator cable control system with azimuth and elevation pantographing.

DESCRIPTION OF THE PREFERRED EMBODIMENTS

Figure 1:
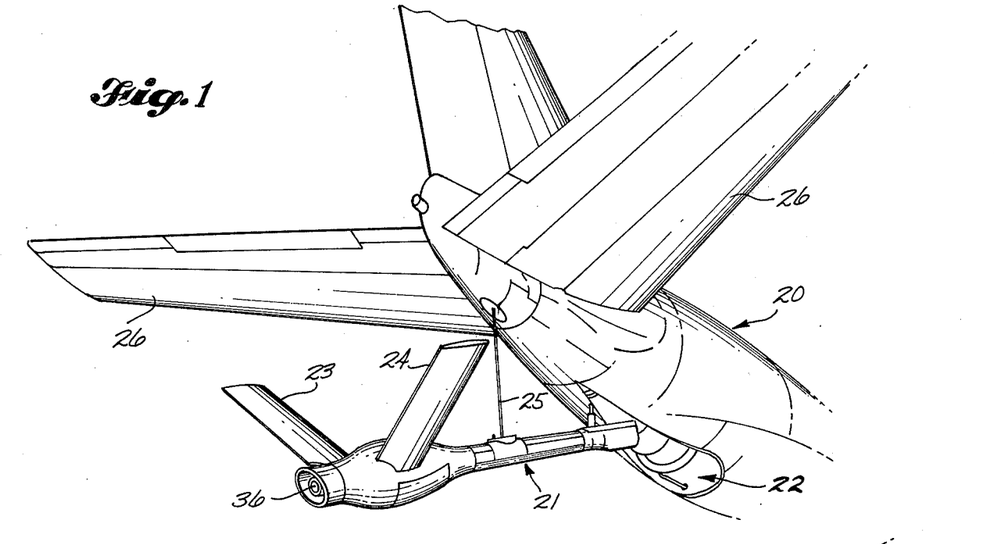
FIG. 1 is a rear perspective view of an aerial tanker airplane having a refueling boom extending aft from the undersurface of the fuselage and with aerodynamic surface termed ruddevators mounted on the refueling boom for in-flight aerodynamic control thereof.

FIG. 1 is a rear perspective view of an aerial refueling tanker airplane 20 and shows the ruddevator controlled boom 21 and the operator's compartment 22 located on the underside of the fuselage. The boom operator lies in a prone position when controlling the movement of the boom 21 through a pair of aerodynamic surfaces 23, 24 which are in the form of a Vee and serve as both rudder and elevator for aerodynamically maneuvering the boom into position for engaging contact with the receiver airplane (not shown). The airstream acting on the ruddevators 23, 24, provides the aerodynamic force for moving the boom 21 in azimuth and elevation.

A hoist cable 25 is attached to the boom 21 at approximately its midpoint for the purpose of pulling the boom to a stowed position. When the boom is in the stowed position, the geometric dihedral of the ruddevators, 23, 24, permit it to fit against the underside of the fuselage and in the Vee formed by the swept-back horizontal tail surfaces 26 of the tanker airplane 20.

Figure 2:
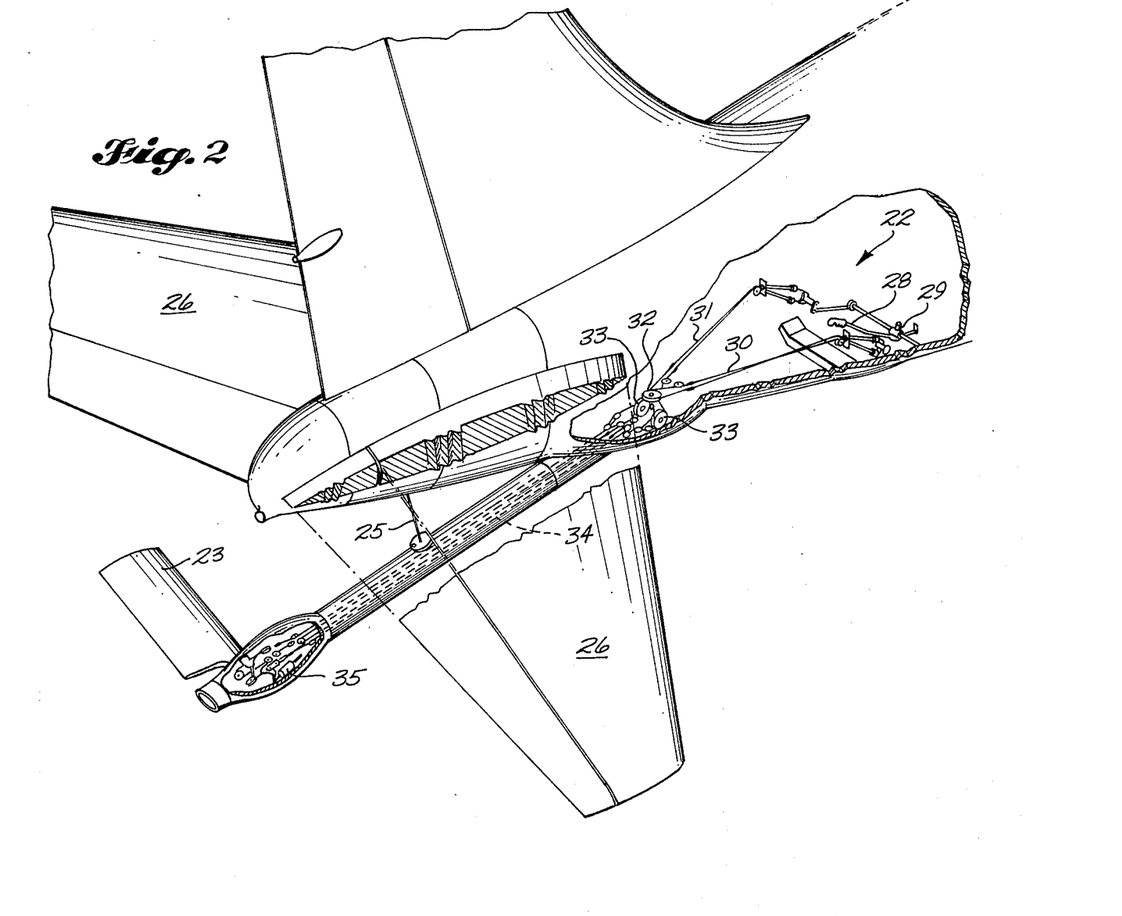
FIG. 2 is also a rear perspective view of the aerial tanker airplane taken at a slightly different angle than that shown in FIG. 1, and shows in cut-away the boom operator's compartment where he lies in an aft facing prone position when controlling the movement of the boom through a ruddevator control system.

FIG. 2 is a rear perspective view of the ruddevator control system, looking down onto the empennage of the tanker airplane 20. The boom operator lies in a prone position facing aft, and controls the movement of the boom 21 through an airplane type control stick 28. Movement of the control stick 28 is transmitted through a differential gear box 29 and cable linkage 30, 31 to azimuth and elevation pantographing drums 32, 33 respectively. Through a cable control interconnection 34 between the pantographing drums 32, 33 and the control valves of hydraulic power units 35 attached to each of the ruddevators 23, 24, the control stick 28 movement is imparted to change the angle-of-attack of the ruddevators 23, 24. Lateral movement of the control stick 28 will cause the ruddevators 23, 24 to rotate in opposite directions and function as an aerodynamic rudder, thereby causing the boom 21 to move in azimuth. Vertical motion of the control stick 28 will cause the ruddevators 23, 24 to rotate in the same direction and function as an aerodynamic elevator, thereby causing the boom 21 to be raised or lowered.

The elevation pantographing drum 33 and the azimuth pantographing drum 32 are rotatably controlled by the control stick 28 through a cable system 31, 30 that goes around each of the drums. With the control stick 28 held in a fixed position, the drums 33, 32 will be held from rotating; however, when the boom 21 is coupled to a receiver airplane (not shown), and the receiver airplane moves the boom 21, then the pantographing mechanism incorporated between the articulation of the boom and the ruddevators 23, 24, will cause a relative movement of the ruddevators 23, 24 with respect to the boom 21. This pantographing movement of the ruddevators 23, 24 will help alleviate the air loads on the ruddevators that would result from the receiver airplane moving the boom 21 with the control stick 28 being held in a fixed position; i.e., the ruddevators 23, 24 will automatically pantograph without any control input from the boom operator, and function similar to that of a drafting machine in that with the control stick 28 in the neutral position, the aerodynamic surfaces 23, 24 will remain more-or-less parallel to the airstream as a function of travel.

Telescoping motion of the boom 21 is accomplished through the means of a sprocket drive chain and cable loop system (not shown) which is attached to the telescoping inner structural tube of the boom. The sprocket is driven by a reversible hydraulic motor through a reduction gear assembly.

When the boom, on a Boeing KC-135 type tanker airplane, is retracted, its length is approximately 27 feet and when extended its length is approximately 47 feet.

The boom 21 is equipped with a nozzle 36 for automatic attachment to a receptacle installed on the receiver airplane. The nozzle 36 is provided with a ball and a universal joint (not shown), to provide flexibility in the nozzle assembly and permit movement of the boom after the nozzle is secured into the receptacle of the receiver airplane. A spring loaded check valve (not shown) forms the seal in the end of the nozzle when the nozzle is not engaged with the receiver receptacle. The generally known boom operates about an azimuth axis that is perpendicular to the tanker airplane water lines, and an elevation axis that lies in the plane of the tanker airplane water lines. The elevation axis is perpendicular to the airplane buttock lines when the boom is straight aft, and the elevation axis rotates about the azimuth axis as the boom moves in azimuth.

The desired conditions for the refueling operation is for the tanker airplane to be capable of attaining both the cruise Mach number of the receiver airplane and an altitude close to that for continued cruise of the receiver airplane after the refueling is completed. However, the size and position of the refueling space envelope of the boom nozzle, is closely dependent upon the speed and altitude of the refueling operation; and these operating conditions may not be the optimum conditions required by the potential receiver airplane. The flying boom operating envelope indicates the area available for the receiver airplane to maneuver within during the refueling operation; and anytime that the receiver airplane, after refueling engagement carries the boom beyond these limits, the boom is automatically disconnected from the receiver airplane.

The air loads on the boom go up very rapidly as the displacement angle i.e., the angle between the longitudinal axis of the tanker airplane and the lengthwise axis of the boom, is increased; or, looking at it from the standpoint of the receiver pilot, as the boom elevation angle is increased. The boom should be capable of attaining the following envelope positions during the in-flight refueling operation; in elevation, from a trail position of 0° in azimuth an elevation displacement of 30°, and within an azimuth displacement of 12° right and 12° left, an elevation displacement between 18° and 45°.

The differential motion of the ruddevator surfaces 23, 24 i.e., the right-hand 24 and left-hand 23 surfaces moving in opposite directions, produces the aerodynamic force moments for rotating the boom about its azimuth axis. The ruddevator control moments for azimuth variation are complicated by the aerodynamic interaction between the airfoil surfaces as they are differentially deflected. It is further complicated by the non-symmetrical flow about the yawed boom and by the collective variation of the ruddevators, to maintain a constant angle of elevation of the boom as it is moved in azimuth. The airflow pattern over the ruddevators, during azimuth variation, is dominated by the influence of the boom fairing and the air loads on the boom which tend to rotate it about its elevation axis. The effectiveness of the ruddevators in pulling the boom down against the boom drag load is determined by the combined ruddevator angle i.e, their combined average angle-of-attack relative to their zero angle-of-attack position. Also, as the boom is moved in azimuth, under the influence of the differentially operated ruddevators, the elevation moment forces tend to increase for maintaining the same angle-of-elevation. If the airfoil surfaces are already operating at their maximum combined lifting capacity or past the linear portion of their lift curve, which they would tend to be if the boom were at its maximum elevation angle of say 45° with respect to the receiver pilot, then when the airfoil surfaces were moved differentially to produce moments for rotating the boom in azimuth, the total combined lift in the elevation plane, would be reduced until an equilibrium point is reached. The results of the combined collective and differential angular movement of the airfoil surfaces in moving the boom to various combinations of elevation and azimuth angles, and at certain Mach numbers, determines the plot of the boom control envelope for that Mach number.

Although the present known flying booms, such as on the KC-135 tanker airplane, are faired to give comparatively low drag when operating within their normal in-flight refueling parameters, any appreciable increase in Mach number or altitude of the refueling operation, would result in a sharp rise in boom drag; and this higher drag would make it impossible for the ruddevators to aerodynamically force the boom into the desired refueling envelope.

Figure 3:
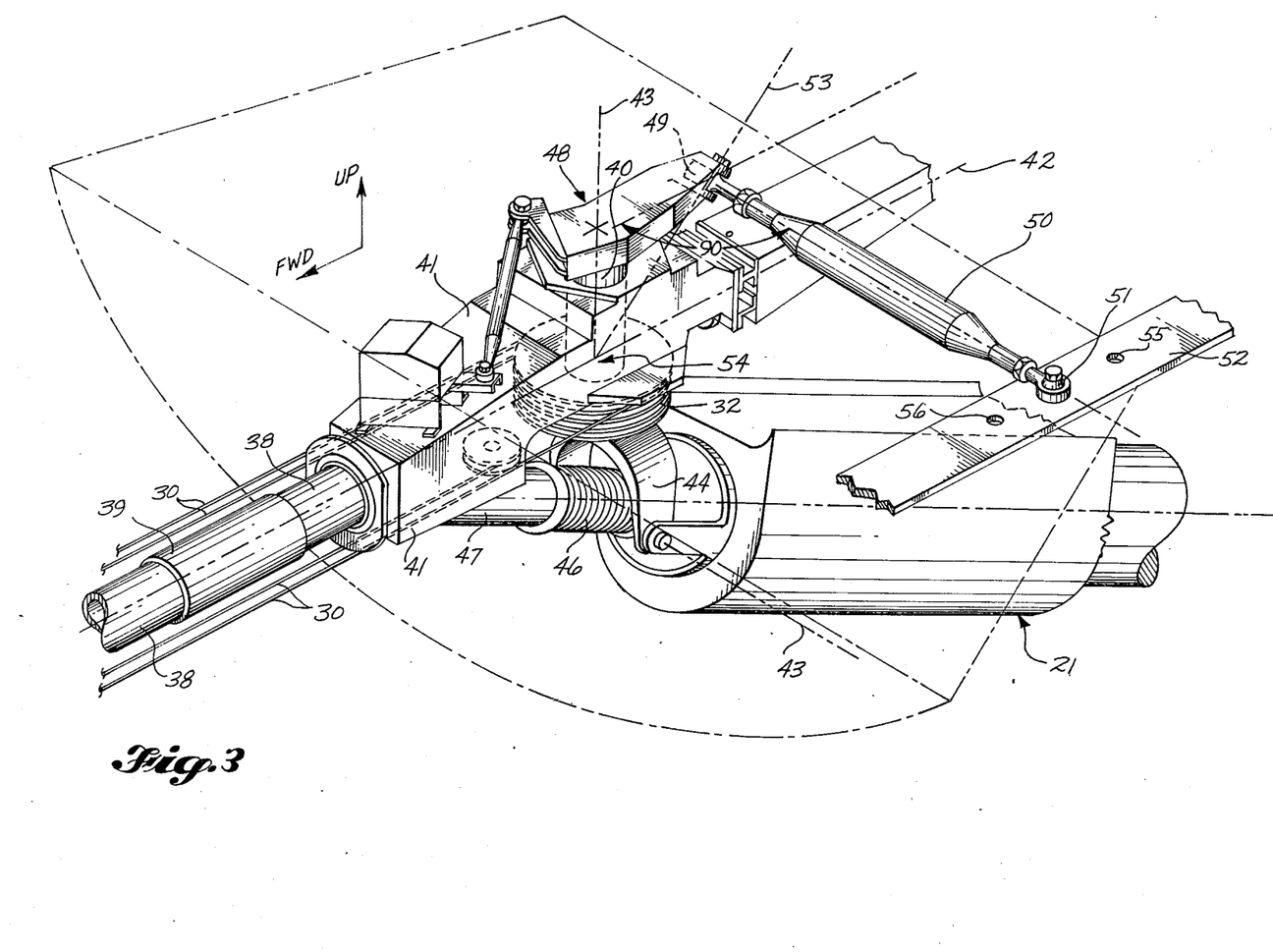
FIG. 3 is an enlarged isometric view of the boom articulation mechanism of the present invention with parts of the elevation and azimuth pantographing mechanism removed for clarity in order to depict the kinematic azimuth arm and idler link that provides the geometry of boom roll motion as a function of change in azimuth angle.
Figure 4:
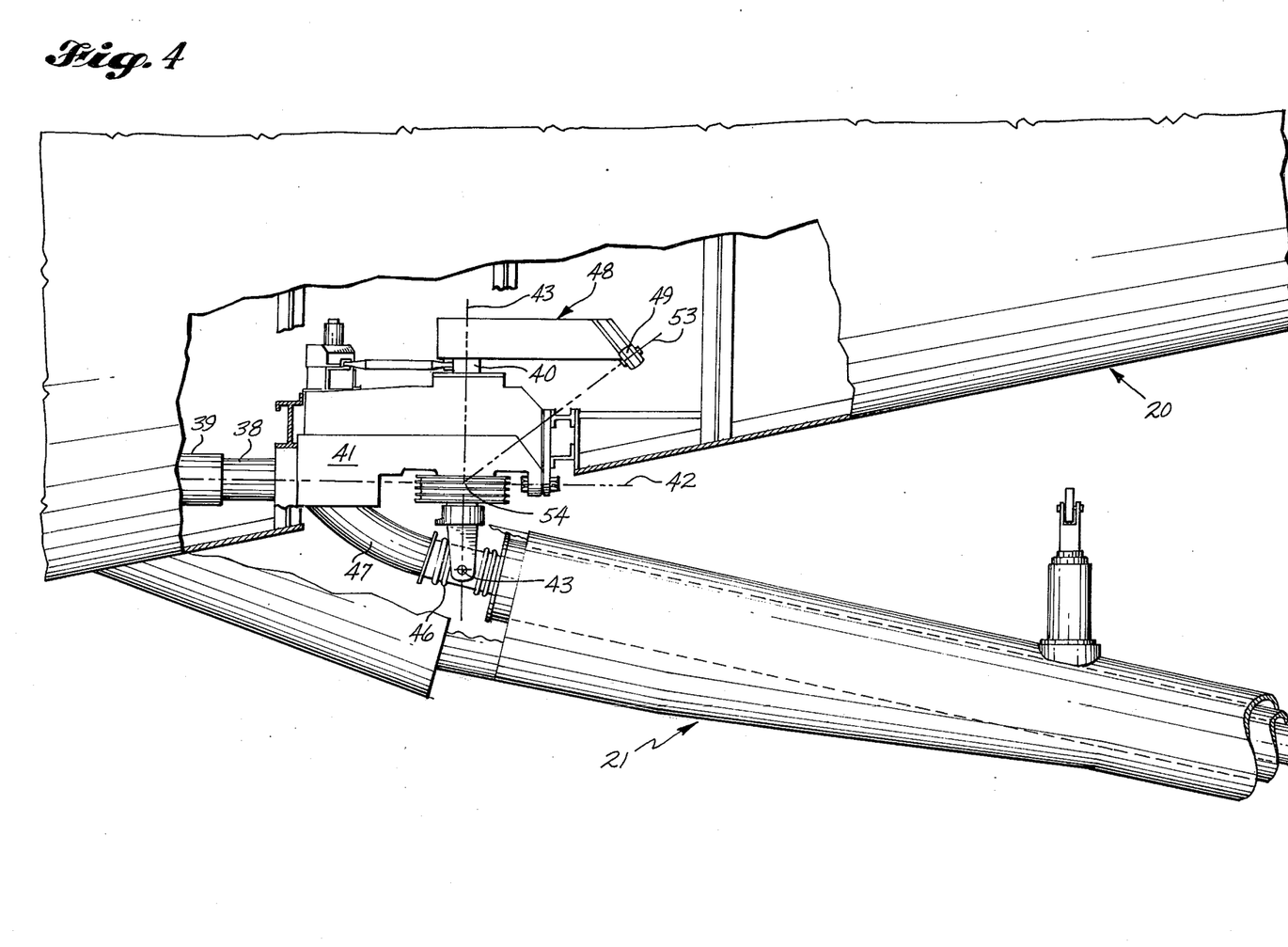
FIG. 4 is a side view of FIG. 3 and shows the aircraft support structure for mounting the aerial refueling boom assembly.

FIG. 3 is an isometric view of the aerial refueling boom mounting arrangement embodying the cant axis pivotal mechanism of the present invention; and FIG. 4 is a side view of FIG. 3 and also includes the aircraft support structure for the mounting assembly.

The cant axis mechanism provides the means for incorporating a certain amount of boom roll motion as a function of the change in azimuth angle. This ratio of roll vs. azimuth angle, can be readily revised by installing different length arm linkages, as hereinafter described, without having to revise the basic structure of the boom or the pantographing system. This combination of linkage geometry provides the means to select the optimum azimuth vs. roll axis for obtaining a relatively large boom control envelope with good boom position stability and control characteristics. To accomplish this, the vertical spindle 40 is mounted in a roll housing 41 instead of being mounted directly to airplane structure, as it is in the prior known aircraft such as the KC-135; and this roll housing 41 is mounted to airplane structure through bearings so that it is free to rotate around on an approximately longitudinal axis 42. The vertical spindle 40 is mounted in the roll housing 41 for rotation about the azimuth axis 43. The lower end of the vertical spindle 40 is bifurcated and forms a yoke 44 to which the refueling boom 21 is pivotally mounted for movement about a transverse or elevational axis 45. The refueling boom 21, at the yoke connection, has a flexible fuel line connector or section 46 for azimuth and elevational movement of the boom without restricting fuel flow through the fuel tube 47 connected to the underside of the roll housing 41. From the aircraft fuel tanks (not shown) the fuel flows through fuel tube 38 and an in-line swivel connection 39 to the roll housing 41; and the swivel connection 39 permits the refueling boom to freely rotate about the longitudinal roll axis 42. For sideward movement of the boom about the azimuth axis 43 the control cables 30 rotate the azimuth pantographing drum 32; and not shown in order to more clearly depict the boom articulation, are the control cables 31 and the elevation pantographing drums 33 which they rotate. Fixedly attached to the top of the vertical spindle 40 is the azimuth arm 48; and the outer end of the azimuth arm 48 is pivotally connected at 49 to one end of the idler link 50. The other end of idler link 50 is pivotally connected at 51 to a fixed structural member 52 of the airplane fuselage. The functional result of the azimuth arm 48 and the idler link connection 49, is geometrically equivalent to picking a fixed cant axis 53; and as shown in FIG. 3, the fixed cant axis 53 runs from the pivotal connection 49 through to the intersection of the vertical spindle azimuth axis 43 with that of the longitudinal housing roll axis 42 or the centroid 54; and it is as though the boom 21 were moving around that cant axis 53 during sideward movement.

By changing the length of the azimuth arm 48, the amount of the roll movement vs. the change in azimuth, is varied; e.g., when the idler link connection 49 is vertically coincident with the azimuth axis 43, there is no relative motion of the boom about the roll axis 42 with sideward movement; but, as the azimuth arm 48 is increased in length so that the idler link connection 49 is displaced from the vertical alignment with the azimuth axis 43, a certain amount of boom roll motion about the roll axis 42 is induced as a function of the displacement from the azimuth axis or the angle of the cant axis 53.

The basic geometry of the canting axis mechanism is such that when the boom is in the aft trail position and aligned with the longitudinal centerline of the airplane fuselage, the azimuth arm 48 should also be in alignment with the longitudinal axis, and the idler link 50 should be at right angles thereto.

When the azimuth arms 48 of different lengths are fixedly mounted onto the vertical spindle 40 for rotation therewith, the attachment geometry of the idler link 50 should be such that it remains at a 90° relationship to the longitudinal centerline of the airplane; e.g., with an increase in the length of the azimuth arm 48, the idler link 50 would have to be attached to fixed structure 52 of the aircraft at a new pivotal connection 55 in order to maintain the idler link 50 at the 90° relationship to the longitudinal centerline of the airplane. This is so that with sideward movement of the boom, that there will be a like kinematic ratio of the boom roll motion with the change in azimuth angle. Also, in order to get the least misalignment on the self-aligning bearing at the intersection 49 of the azimuth arm 48 and the idler link 50, the intersection 49 should be in the vertical plane of the longitudinal centerline of the airplane; and the idler link 50 should be normal to that plane. Also, the pivotal axis of the interconnection point 49 should lie on the canted axis 53 which aims at the centroid 54, so as to produce the least misalignment of the bearing at 49 with lateral movement of the boom.

Figure 5:
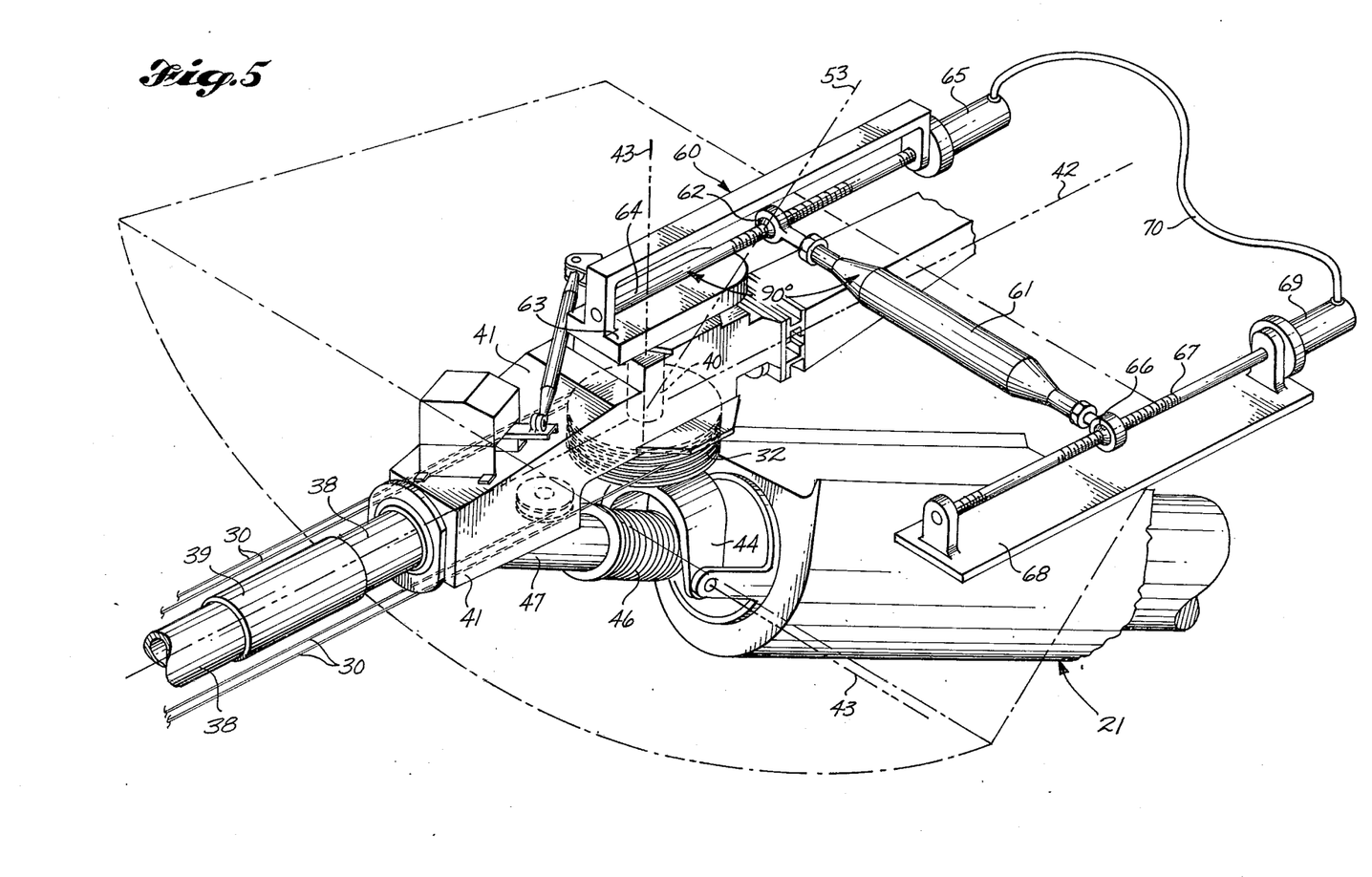
FIG. 5 is an isometric view of a second embodiment of the invention showing an adjustable length azimuth arm in combination with an adjustable idler linkage connection to aircraft structure for providing an in flight variation in the ratio of boom roll motion vs. the change in azimuth angle.

FIG. 5 is an isometric view of another embodiment of the invention and shows an aerial refueling boom mounting arrangement somewhat similar to that of FIGS. 3 and 4, with the exception of a different cant axis mechanism. Those elements that are similar to those previously described have like numerals and where there are some differences in the elements, they have been identified with different numerals. The boom mounting arrangement shown in FIG. 5, embodies a variable azimuth axis pivotal mechanism for providing a predetermined amount of boom roll motion as a function of the change in azimuth angle and makes this possible while the tanker and receiver airplane are in-flight. This mechanism provides the optimum, azimuth vs. roll axis, for obtaining a relatively large boom control envelope with good boom position stability and control characteristics. The advantage of making the inclination of the azimuth axis variable in-flight, is to improve the boom control envelope by more readily adapting it to the in-flight operating conditions of the receiver aircraft. To accomplish this, the cant axis mechanism shown, incorporates a variable length azimuth arm 60 in combination with an adjustable idler link 61 having a universal or ball joint connection 62 at the interconnection. The variable length azimuth arm 60 comprises: a base member 63 that is fixedly attached to the top of the vertical spindle 40 for rotation therewith; a screw 64 mounted to said base member 63 for rotation about a longitudinal axis; and a servo 65 for rotatably driving the screw 64. The idler link 61 is connected at one end through a threadably engaging universal or ball point connection 62, to the screw 64, for movement along the screw 64 when rotated by the servo 65. The other end 66 of idler link 61 is also connected through a threadably engaging ball joint connection, to a screw 67 that is rotatably mounted in a support base 68 which is fixedly attached to aircraft structure. The screw 67 is rotatably driven by the servo 69; and a flexible shaft 70 interconnects and synchronizes the two servos 65 and 69, so that the idler arm 61 will remain at a 90° relationship with the azimuth arm 60, as the length of the azimuth arm 60 is varied, for changing the angle of inclination of the cant axis 53. The functional result of varying the length of the azimuth arm 60, or the distance that the one end 62 of the idler link 61 is displaced from the vertical spindle axis 43, is that the angle of inclination of the cant axis 53 is changed; and as previously described with respect to FIGS. 3 and 4, this induces a certain amount of boom roll motion about the roll axis 42 as a function of the displacement from the vertical spindle axis 43 or the angle of the cant axis 53.

Figures 6, 7:
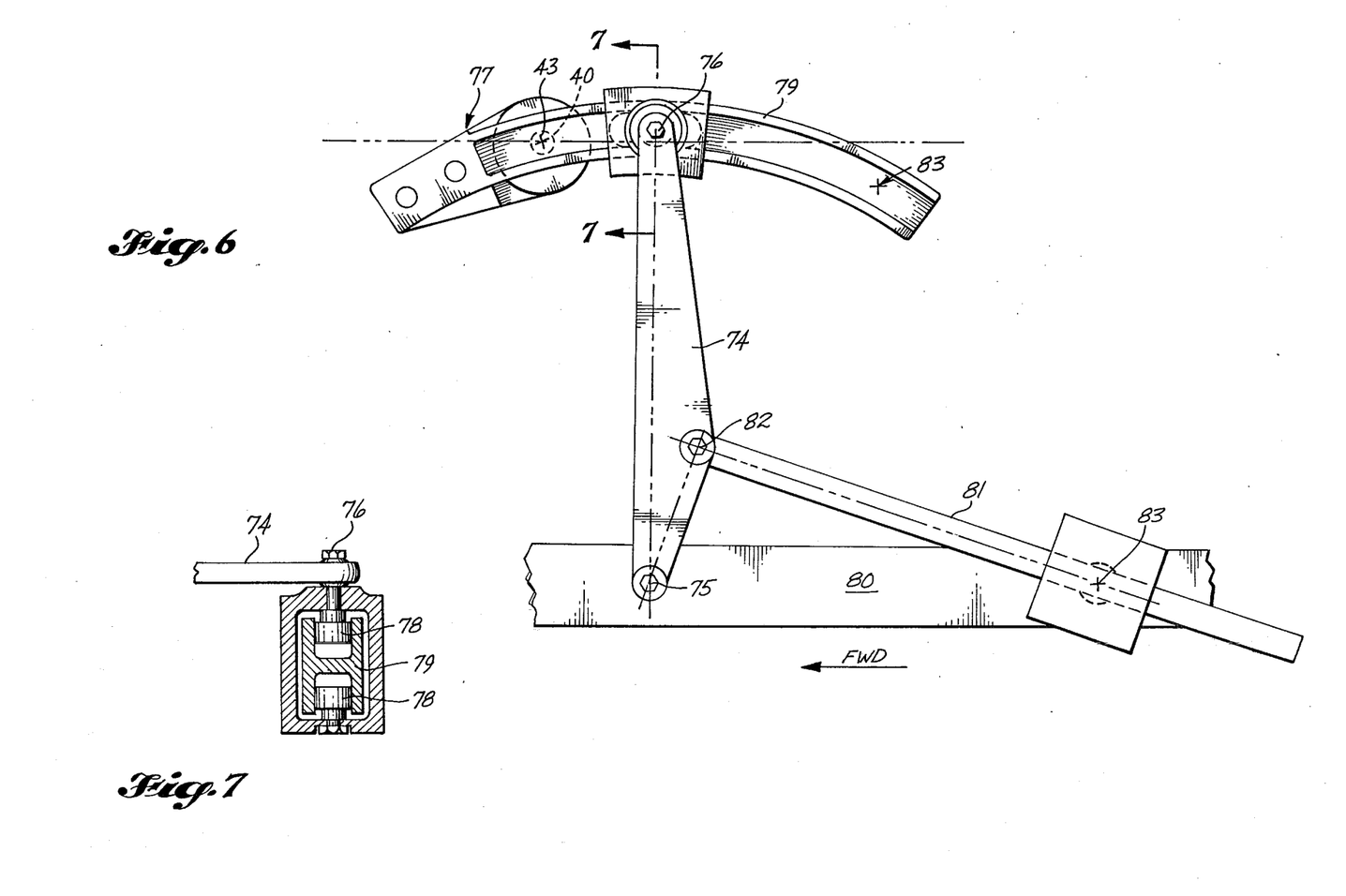
FIG. 6 is a plan view of a third embodiment of the invention showing a curved track azimuth arm in combination with a structurally fixed pivotal connection of the idler link, and actuating means for changing the interconnecting point between the azimuth arm and idler link for varying the ratio of boom roll motion vs. the change in azimuth angle.
FIG. 7 is a cross-sectional view taken in the direction 7—7 of FIG. 6, and shows the roller and track engagement of the azimuth arm and idler link.

FIG. 6 is a plan view of a third embodiment of the invention and also shows an aerial refueling boom mounting arrangement somewhat similar to that shown in FIGS. 3 and 4; with the exception of a different cant axis mechanism with incorporates means for making the change in inclination of the cant axis, adjustable in flight. It is to be understood that this cant axis mechanism is to be combined with the bottom and support housing depicted in the preferred embodiment of FIGS. 3 and 4 and in a manner similar to that shown with respect to FIG. 5. The boom cant axis mechanism comprises an idler link 74 having one end attached at 75 to fixed structure of the airplane and the other end is connected at 76 to the azimuth arm 77, through rollers 78 to a curved track 79 fixedly attached to the vertical spindle 40. FIG. 7 is a cross-sectional view taken in the direction 7—7 of FIG. 6, and shows the details of the rollers 78 and curved track 79 engagement. The curved track 79 is a radius about the center point 75, where the idler link 74 connects onto fixed aircraft structure 80. An actuator 81 has one end pivotally connected at 82 to the idler link 74 and the other end 83 is pivotally connected to fixed structure 80 of the airplane. When the idler link 74 is moved by the actuator 81 to different positions on the curved or arced track 79, assuming that the refueling boom 21 is in the aft position and parallel to the longitudinal centerline of the airplane, there will be very little motion of the boom induced thereby, in comparison to a track that was straight; e.g., in the case of a straight track, as soon as the idler link 74 were moved by the actuator 81, the vertical spindle 40 would be pulled off from the longitudinal centerline of the airplane or out of the vertical plane passing through the longitudinal centerline of the airplane, and this would result in the vertical spindle 40 being rotated about the roll axis 42; thereby, producing a change in the boom operating geometry. Therefore, by utilizing a curved track 79 or by generating an arc for the movement of the idler link 74 to traverse, the idler link 74 can be moved to different distances from the vertical spindle axis 43 without inducing any rotation of the vertical spindle 40 about the roll axis 42. With this curved track articulation, the inclination of the cant axis 53 can be varied in-flight to more readily adapt the boom operating envelope to the flight conditions of the receiver airplane. However, with the particular linkage mechanism shown in FIG. 6, the same 90° relationship between the azimuth arm 77 and the idler link 74 does not remain constant, as was previously described with respect to the mechanism shown in FIG. 5, and it is now somewhat modified. Initially, the geometry of the linkage mechanism shown in FIG. 6, starts out at a 90° relationship at some nominal position; however, with the fore and aft movement of the idler link 74 from this 90° relationship position, there will be some modification to the preferred boom operating geometry; in that, movement of the idler link 74 will result in a slight lateral inclination of the cant axis 53. However, although this lateral inclination of the cant axis 53 will result in some minor variation in the operation of the boom throughout its flight control envelope, it is not enough to make it unacceptable. For instance, when the idler link 74 is moved along the arced track 79 from the position shown in FIG. 6, by the actuator 81 to the position 83, the interconnecting point 76, between the idler link 74 and the arced track 79, will be offset from the vertical plane passing through the longitudinal centerline of the airplane; but, the azimuth arm 77 which comprises the arced track 79, has not been rotated to cause movement of the boom about the azimuth axis 43;

and the slight amount of offset of the attach point 76 when it is at the indicated position 83, from the vertical plane passing through the longitudinal centerline of the airplane, does not produce enough lateral inclination of the cant axis 53 that would be considered detrimental to the flight control of the refueling boom through the pantographing mechanism and ruddevator control system.

The logic behind the present invention is, that with essentially the same mechanical system that exists in the present known Boeing KC-135 tanker type airplane i.e., including the same pantographing control system, that a mechanism could be devised, such that a certain amount of boom roll motion could be incorporated with sideward movement of the boom; and further, wherein the degree of roll motion vs. the change in azimuth angle, could be varied in-flight in order to more readily adapt the boom operating envelope to that of the flight conditions of the receiver airplane. Therefore, by incorporating this invention into the KC-135, essentially all of the boom mechanism can be utilized including the cable control system and the pantographing system; and this will improve the present KC-135 system, because an optimum cant axis can be provided for varying the degree of boom roll motion.

What is claimed is:

1. Apparatus for attaching a boom to a supply airplane for the aerial transfer of material to a receiver airplane, comprising: a boom housing mounted to support structure of the supply airplane for rotation about a roll axis approximately parallel to the longitudinal axis of the supply airplane; a spindle supported in said housing for rotation about a vertical axis approximately parallel to the yaw axis of the supply airplane; said spindle connectably supporting the boom for rotation about an axis of elevation relative to the receiver airplane, said elevation axis being approximately transverse to the longitudinal axis of the supply airplane; and means interconnected between said spindle and fixed structure of the supply airplane for kinematically producing a geometrically canted azimuth axis which provides a certain amount of boom motion about said roll axis with sideward movement of the boom.

2. Apparatus for attaching an aerial refueling boom to a tanker airplane, comprising: a refueling boom housing mounted to airplane support structure for rotation about a roll axis approximately parallel to the longitudinal axis of the tanker airplane; a vertical spindle mounted in said housing for rotation about an azimuth axis approximately parallel to the yaw axis of the tanker airplane; said spindle having a lower bifurcated section formed into a yoke for pivotally supporting the refueling boom for rotation about an elevation axis approximately transverse to the longitudinal axis of the tanker airplane; means interconnecting between said spindle and fixed structure of the tanker airplane for geometrically inclining the azimuth axis to induce a relative motion of the boom about the roll axis when displaced sidewards; whereby the boom control envelope is modified by varying the inclination of the azimuth axis.

3. Apparatus for attaching a boom to a supply airplane for the aerial transfer of material to a receiver airplane, comprising: a boom housing mounted to support structure of the supply airplane for rotation about a roll axis approximately parallel to the longitudinal axis of the supply airplane; a spindle supported in said housing for rotation about a vertical axis approximately parallel to the yaw axis of the supply airplane; said spindle connectably supporting the boom for rotation about an axis of elevation relative to the receiver airplane, said elevation axis being approximately transverse to the longitudinal axis of the supply airplane; an arm fixedly mounted to the spindle for rotation therewith; an idler link connected at one end to said arm, and at the other end to fixed structure of the supply airplane; said arm and idler link connection functioning to geometrically cant the azimuth axis and induce a relative motion of the boom about the roll axis when the boom is displaced sidewards by the engaged receiver airplane.

4. Apparatus for attaching a boom to a tanker airplane for aerial refueing of a receiver airplane, comprising: a refueling boom housing mounted to tanker airplane support structure for rotation about a roll axis approximately parallel to the longitudinal axis of the tanker airplane; a spindle mounted in said housing for rotation about an azimuth axis approximately parallel to the yaw axis of the tanker airplane; said spindle having a lower bifurcated section formed into a yoke for pivotally supporting the refueling boom for rotation about an elevation axis approximately transverse to the longitudinal axis of the tanker airplane; an adjustable length arm fixedly mounted to the top of the spindle for rotation therewith; an idler link connected at one end to said arm, and at the other end to fixed structure of the tanker airplane; said adjustable length arm and idler link connection functioning kinematically to geometrically cant the azimuth axis and induce a relative motion of the boom about the roll axis when the boom is displaced sidewards by the engaged receiver airplane.

5. Apparatus for transferring material from a supply airplane to a receiver airplane, comprising: a tube for transferring material therethrough from the supply airplane to the receiver airplane; a nozzle connected to one end of the tube for attachment to the receiver airplane; articulation means connected to the other end of the tube for supportably attaching it to the supply airplane; said articulation means comprising a housing, a spindle, and a kinematic mechanism; said housing being mounted to support structure of the supply airplane for rotation about a roll axis which is approximately parallel to the longitudinal axis of the supply airplane; said spindle being rotatably supported at its upper end in said housing for rotation about a vertical axis which is normal to said roll axis and approximately parallel to the yaw axis of the supply airplane; said spindle having its lower end bifurcated to form a yoke for pivotally supporting said tube for movement about an elevation axis relative to the pilot of the receiver airplane, said elevation axis being approximately transverse to the longitudinal axis of the supply airplane; and said kinematic mechanism being interconnected between said spindle and fixed structure of the supply airplane for providing a certain amount of motion of said tube about said roll axis, with rotation of said tube about said vertical spindle axis.

6. Apparatus for refueling a receiver airplane from a tanker airplane, comprising: a refueling boom for transferring fuel therethrough from the tanker airplane to a receiver airplane; a nozzle connected to one end of said boom for attachment to the receiver airplane; articulation means connected to the other end of said boom for supportably attaching it to the tanker airplane; said articulation means comprising a housing, a spindle, and a kinematic mechanism; said housing being mounted to support structure of the tanker airplane for rotation about a roll axis which is approximately parallel to the longitudinal axis of the tanker airplane; said spindle being rotatably supported at its upper end in said housing for rotation about a vertical axis which is normal to said roll axis and approximately parallel to the yaw axis of the tanker airplane; said spindle having its lower end bifurcated to form a yoke for pivotally supporting said boom for movement about an elevation axis with respect to the receiver airplane pilot, said elevation axis being approximately transverse to the longitudinal axis of the tanker airplane; and said kinematic mechanism being interconnected between said spindle and fixed structure of the tanker airplane for providing a certain amount of motion of said boom about said roll axis, with rotation of said boom about said vertical spindle axis.

7. Apparatus for transferring material from a supply airplane to a receiver airplane, comprising: a tube for transferring material therethrough from the supply airplane to the receiver airplane; a nozzle connected to one end of the tube for attachment to the receiver airplane; a boom housing mounted to support structure of the supply airplane for rotation about a roll axis approximately parallel to the longitudinal axis of the supply airplane; a spindle being supported at its upper end in said housing for rotation about a vertical axis which is normal to said roll axis and approximately parallel to the yaw axis of the supply airplane; said spindle having at its lower end a bifurcated section formed into a yoke for pivotally supporting the refueling boom for movement about an elevation axis relative to the pilot of the receiver airplane said elevation axis being approximately transverse to the longitudinal axis of the supply airplane; a kinematic mechanism comprising an arm and an idler link; said arm being fixedly mounted to the top of said spindle for rotation therewith; said idler link being connected at one end to said arm and at the other end to fixed structure of the supply airplane; whereby said kinematic mechanism, which is interconnected between said spindle and fixed structure of the supply airplane; functions to geometrically cant the azimuth axis thereby providing a certain amount of motion of said boom about said roll axis with rotation of said boom about said vertical spindle axis, when the boom is displace sidewards by the engaged receiver airplane.

8. Apparatus for refueling a receiver airplane from a tanker airplane, comprising: a refueling boom for transferring fuel therethrough from the tanker airplane to a receiver airplane; a nozzle connected to one end of said boom for attachment to the receiver airplane; a refueling boom housing mounted to support structure of the tanker airplane for rotation about a roll axis approximately parallel to the longitudinal axis of the tanker airplane; a spindle being supported at its upper end in said housing for rotation about a vertical axis which is normal to said roll axis and approximately parallel to the yaw axis of the tanker airplane; said spindle having at its lower end a bifurcated section formed into a yoke for pivotally supporting the refueling boom for movement about an elevation axis relative to the pilot of the receiver airplane said elevation axis being approximately transverse to the longitudinal axis of the tanker airplane; a kinematic mechanism comprising an arm and an idler link; said arm being fixedly mounted to the top of said spindle for rotation therewith; said idler link being connected at one end to said arm and at the other end to fixed structure of the tanker airplane; whereby said kinematic mechanism, which is interconnected between said spindle and fixed structure of the tanker airplane, functions to geometrically cant the azimuth axis thereby providing a certain amount of motion of said boom about said roll axis with rotation of said boom about said vertical spindle axis, when the boom is displaced sidewards by the engaged receiver airplane.

9. Apparatus for attaching a boom to a supply airplane for the aerial transfer of material to a receiver airplane, comprising: a boom housing mounted to support structure of the supply airplane for rotation about a roll axis approximately parallel to the longitudinal axis of the supply airplane; a spindle supported in said housing for rotation about a vertical axis approximately parallel to the yaw axis of the supply airplane and intersecting the roll axis of the refueling boom housing, at a centroid; said spindle connectably supporting the refueling boom for movement about an axis of elevation relative to a receiver airplane, said axis of elevation being approximately transverse to the longitudinal axis of the supply airplane; an azimuth arm fixedly attached at its inner end to said spindle for rotation therewith and being in directional alignment with the lengthwise axis of the refueling boom; an idler link connected at one end to fixed structure of the supply airplane, and at its other end to an interconnection point with the outer end of the azimuth arm; said interconnection point, of the azimuth arm and the idler link, being approximately in a vertical plane passing through the longitudinal axis of the supply airplane and functioning to geometrically cant the azimuth axis, which is a straight line passing through said interconnection point and said centroid, so as to provide a certain amount of boom roll motion with sideward movement thereof.

10. Apparatus for attaching an aerial refueling boom to a tanker airplane, comprising: a refueling boom housing mounted to support structure of the tanker airplane for rotation about a roll axis approximately parallel to the longitudinal axis of the tanker airplane; a spindle supported in said housing for rotation about a vertical axis approximately parallel to the yaw axis of the tanker airplane and intersecting the roll axis of the refueling boom housing, at a centroid; said spindle having a bifurcated section formed into a yoke for connectably supporting the refueling boom for movement about an axis of elevation relative to a receiver airplane, said axis of elevation being approximately transverse to the longitudinal axis of the tanker airplane; an azimuth arm fixedly attached at its inner end to said spindle for rotation therewith and being in directional alignment with the lengthwise axis of the refueling boom; an idler link connected at one end to fixed structure of the tanker airplane, and at its other end to an interconnection point with the outer end of the azimuth arm; said interconnection point, of the azimuth arm and the idler link, being approximately in a vertical plane passing through the longitudinal axis of the tanker airplane; and said azimuth arm and idler link functioning to geometrically cant the azimuth axis, which is a straight line passing through said interconnection point and said centroid, so as to produce a certain amount of boom motion about said roll axis with sideward movement of the boom.

11. Apparatus for attaching an aerial refueling boom to a tanker airplane, comprising: a refueling boom housing mounted to support structure of the tanker airplane for rotation about a roll axis approximately parallel to the longitudinal axis of the tanker airplane; a spindle supported in said housing for rotation about a vertical axis approximately parallel to the yaw axis of the tanker airplane and intersecting the roll axis of the refueling boom housing, at a centroid; said spindle having a bifurcated section formed into a yoke for connectably supporting the refueling boom for movement about an axis of elevation relative to a receiver airplane, said axis of elevation being approximately transverse to the longitudinal axis of the tanker airplane; an azimuth arm having a curved track and being fixedly attached towards one end of said track to said spindle for rotation therewith; an idler link connected at one end to support structure of the tanker airplane through a fixed pivotal connection, and at its other end to an interconnection point with the azimuth arm through a follower engaging the curved track of the azimuth arm; means for actuating the idler link for rotation about its fixed pivotal connection and displacing said interconnection point, of said curved track of the azimuth arm with said follower of the idler link, from the vertical spindle axis; and said means functioning to geometrically cant the azimuth axis, which is a straight line passing through said interconnection point and said centroid, so as to provide a certain amount of boom roll motion with sideward movement thereof.

12. Apparatus for attaching a boom to a supply airplane for the aerial transfer of material to a receiver airplane, comprising: a boom housing mounted to support structure of the supply airplane for rotation about a roll axis approximately parallel to the longitudinal axis of the tanker airplane; a spindle supported in said housing for rotation about a vertical axis approximately parallel to the yaw axis of the supply airplane and intersecting the roll axis of the refueling boom housing at a centroid; said spindle connectably supporting the boom for movement about an axis of elevation relative to a receiver airplane, said axis of elevation being approximately transverse to the longitudinal axis of the supply airplane; an azimuth arm being extensible in length and fixedly connected at one end to said spindle for rotation therewith; said azimuth arm having its lengthwise axis in directional alignment with the lengthwise axis of the boom; an idler link connected at one end to an interconnection point with the other end of the azimuth arm, and movably connected at the other end to fixed structure of the supply airplane; means for adjusting the length of the azimuth arm to displace said interconnection point, of said arm and link, from the vertical spindle axis, and for moving the end of the idler link connected to airplane structure in a direction parallel to the longitudinal axis of the supply airplane, to maintain an approximately right angular relationship between the azimuth arm and the idler link; and said means functioning kinematically to geometrically cant the azimuth axis, which is a straight line passing through said interconnection point and said centroid, so as to provide a certain amount of boom roll motion with sideward movement thereof.

13. Apparatus for attaching an aerial refueling boom to a tanker airplane, comprising: a refueling boom housing mounted to support structure of the tanker airplane for rotation about a roll axis approximately parallel to the longitudinal axis of the tanker airplane; a spindle supported in said housing for rotation about a vertical axis approximately parallel to the yaw axis of the tanker airplane and intersecting the roll axis of the refueling boom housing at a centroid; said spindle connectably supporting the refueling boom for movement about an axis of elevation relative to a receiver airplane, said axis of elevation being approximately transverse to the longitudinal axis of the tanker airplane; an azimuth arm being extensible in length and fixedly connected at one end to said spindle for rotation therewith; said azimuth arm having its lengthwise axis in directional alignment with the lengthwise axis of the refueling boom; an idler link connected at one end to an interconnection point with the other end of the azimuth arm, and movably connected at the other end to fixed structure of the tanker airplane; means for adjusting the length of the azimuth arm to displace said interconnection point, of said arm and link, from the vertical spindle axis, and for moving the end of the idler link connected to airplane structure in a direction parallel to the longitudinal axis of the tanker airplane, to maintain an approximately right angular relationship between the azimuth arm and the idler link; and said means functioning kinematically to geometrically cant the azimuth axis, which is a straight line passing through said interconnection point and said centroid, so as to provide a certain amount of boom roll motion with sideward movement thereof.

* * * * *